(12) United States Patent
Muñoz de la Torre Alonso

(10) Patent No.: US 12,452,091 B2
(45) Date of Patent: Oct. 21, 2025

(54) QUALITY OF SERVICE DEPENDENT POLICY RULES

(71) Applicant: Telefonaktiebolaget LM Ericsson (publ), Stockholm (SE)

(72) Inventor: Miguel Angel Muñoz de la Torre Alonso, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 534 days.

(21) Appl. No.: 17/924,025

(22) PCT Filed: Aug. 24, 2020

(86) PCT No.: PCT/EP2020/073611
§ 371 (c)(1),
(2) Date: Nov. 8, 2022

(87) PCT Pub. No.: WO2022/022840
PCT Pub. Date: Feb. 3, 2022

(65) Prior Publication Data
US 2023/0179437 A1 Jun. 8, 2023

(30) Foreign Application Priority Data
Jul. 28, 2020 (EP) .................................... 20382680

(51) Int. Cl.
*H04L 12/14* (2024.01)
*H04M 15/00* (2024.01)

(52) U.S. Cl.
CPC ........ *H04L 12/1407* (2013.01); *H04M 15/66* (2013.01); *H04M 15/8016* (2013.01)

(58) Field of Classification Search
CPC .............. H04L 12/1407; H04M 15/66; H04M 15/8016; H04W 4/24
See application file for complete search history.

(56) References Cited

U.S. PATENT DOCUMENTS

2011/0320622 A1* 12/2011 Cutler ..................... H04W 4/24
709/230
2013/0166746 A1* 6/2013 Andreasen .......... H04L 41/5051
709/225
(Continued)

FOREIGN PATENT DOCUMENTS

WO 2014110410 A1 7/2014
WO 2014187477 A1 11/2014
(Continued)

OTHER PUBLICATIONS

3rd Generation Partnership Project, "3rd Generation Partnership Project; Technical Specification Group Core Network and Terminals; Interface between the Control Plane and the User Plane Nodes; Stage 3 (Release 16)", Technical Specification, 3GPP TS 29.244 V16.3.1, Apr. 1, 2020, pp. 1-297, 3GPP, France.

*Primary Examiner* — Christopher M Brandt
(74) *Attorney, Agent, or Firm* — COATS & BENNETT, PLLC

(57) ABSTRACT

A method for operating a policy control entity (100) in a cellular network, the method comprising: —receiving subscriber data comprising a policy with an indication that a conditional Quality-of-Service handling is to be applied to a data packet session exchanged between a user equipment of a subscriber and an application in dependence on at least one condition, the sub-scriber data further comprising a charging indication used for charging the subscriber for the data packet session in dependence on the fact whether the conditional Quality-of-Service handling has been applied to the data packet session, —generating a policy and charging rule for the data packet session, the policy and charging rule comprising the conditional Quality-of-Service handling of the data packet session in dependence on the condition and the charging of the subscriber in dependence on the fact whether the conditional Quality-of-Service handling has (Continued)

been applied or not, —transmitting the generated policy and charging rule to a session management entity of the cellular network configured to manage the data packet session in the cellular network.

20 Claims, 15 Drawing Sheets

(56) References Cited

U.S. PATENT DOCUMENTS

2014/0307549 A1* 10/2014 Kotecha .............. H04L 47/2441
                                                        370/235
2019/0261222 A1*  8/2019 Raleigh ................ H04W 28/10

FOREIGN PATENT DOCUMENTS

| WO | 2019238252 | A1 | 12/2019 |
| WO | 2020083515 | A1 | 12/2019 |
| WO | 2020001795 | A1 | 1/2020 |

* cited by examiner

| Feature Octet / Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |

. .

| | | | |
|---|---|---|---|
| 9/1 | ATSSS-LL | N4 | UPF support of ATSSS-LLL steering functionality (see clause 5.20) |
| 9/2 | QFQM | N4 | UPF support of per QoS flow per UE QoS monitoring (see clause 5.24.4). |
| 9/3 | GPQM | N4 | UPF support of per GTP-U Path QoS monitoring (see clause 5.24.5). |
| 9/4 | RQOS | Sxb, Sxc, N4 | Reporting based on QoS action is supported by the UP function. |

Feature Octet / Bit: The octet and bit number within the Supported-Features IE, e.g. "5 / 1".
Feature: A short name that can be used to refer to the octet / bit and to the feature.
Interface: A list of applicable interfaces to the feature.
Description: A clear textual description of the feature.

FIG.3

| Octet 1 and 2 | Create URR IE Type = 6 (decimal) | | | | | |
|---|---|---|---|---|---|---|
| Octets 3 and 4 | Length = n | | | | | |
| Information elements | P | Condition / Comment | Appl. | | | IE Type |
| | | | Sxa | Sxb | Sxc | N4 | |
| URR ID | M | This IE shall uniquely identify the URR among all the URRs configured for this PFCP session. | X | X | X | X | URR ID |
| Measurement Method | M | This IE shall indicate the method for measuring the network resources usage, i.e. whether the data volume, duration (i.e. time), combined volume/duration, or event shall be measured. | X | X | X | X | Measurement Method |
| Reporting Triggers | M | This IE shall indicate the trigger(s) for reporting network resources usage to the CP function, e.g. periodic reporting or reporting upon reaching a threshold, or envelope closure. | X | X | X | X | Reporting Triggers |

| | | | | | | | |
|---|---|---|---|---|---|---|---|
| Measurement Information | C | This IE shall be included if any of the following flag is set to 1.<br>Applicable flags are:<br>- Measurement Before QoS Enforcement Flag: this flag shall be set to 1 if the traffic usage before any QoS Enforcement is requested to be measured. | | - | X | X | X | Measurement Information |
| | | - Inactive Measurement Flag: this flag shall be set to 1 if the measurement shall be paused (inactive). The measurement shall be performed (active) if the bit is set to 0 or if the Measurement Information IE is not present in the Create URR IE. | - | X | - | X | |
| | | - Reduced Application Detection Information Flag: this flag may be set to 1, if the Reporting Triggers request to report the start or stop of application, to request the UP function to only report the Application ID in the Application Detection Information, e.g. for envelope reporting. | - | X | - | X | |
| | | - Immediate Start Time Metering Flag: this flag may be set to 1 if time-based measurement is used and the UP function is requested to start the time metering immediately at receiving the flag. . | - | X | X | X | |
| | | - Measurement of Number of Packets Flag: this flag may be set to 1 when the Volume-based measurement applies, to request the UP function to report the number of packets in UL/DL/Total in addition to the measurement in octet. | X | X | X | X | |
| | | - QoS Flag: this flag may be set to 1 if differentiated reporting is required based on QoS action being applied, and this information to be included in the PFCP Session Report request message for this URR | - | X | X | X | |

FIG.4b

| Octet 1 and 2 | Usage Report IE Type = 80 (decimal) | | | | | |
|---|---|---|---|---|---|---|
| Octets 3 and 4 | Length = n | | | | | |
| Information elements | P | Condition / Comment | Appl. | | | | IE Type |
| | | | Sxa | Sxb | Sxc | N4 | |
| URR ID | M | This IE shall identify the URR for which usage is reported. | X | X | X | X | URR ID |
| UR-SEQN | M | This IE shall uniquely identify the Usage Report for the URR (see clause 5.2.2.3). | X | X | X | X | UR-SEQN |
| Usage Report Trigger | M | This IE shall identify the trigger for this report. | X | X | X | X | Usage Report Trigger |
| Start Time | C | This IE shall be present, except if the Usage Report Trigger indicates 'Start of Traffic', 'Stop of Traffic' or 'MAC Addresses Reporting'. When present, this IE shall provide the timestamp when the collection of the information in this report was started. | X | X | X | X | Start Time |

. . .

| Ethernet Traffic Information | C | This IE shall be present if Ethernet Traffic Information needs to be reported. See Table 7.5.8.3-3. | - | - | - | X | Ethernet Traffic Information |
|---|---|---|---|---|---|---|---|
| QoS Information | C | Several IEs with the same IE type may be present to report multiple occurrences for an event for this URR ID. | - | X | X | X | QoS Information |
| NOTE 1: This is the case for unsolicited application reporting by the TDF. The Network instance is required when the UE IP address cannot be used to determine the corresponding PDN connection. | | | | | | | |

FIG.5

| Octet 1 and 2 | | QoS Information IE Type = XX (decimal) | |
|---|---|---|---|
| Octets 3 and 4 | | Length = n | |
| Information elements | P | Condition / Comment | IE Type |
| QoS action | M | This IE shall identify the QoS action, e.g. shaping applied (and optionally the shaping level) or shaping not applied. | QoS action |
| Uplink Volume Measurement | C | This IE shall be present if a uplink volume measurement needs to be reported. | Uplink Volume Measurement |
| Downlink Volume Measurement | C | This IE shall be present if a downlink volume measurement needs to be reported. | Downlink Volume Measurement |

FIG.6

QUALITY OF SERVICE DEPENDENT POLICY RULES

TECHNICAL FIELD

The present application relates to a method for operating a policy control entity in a cellular network and to the corresponding policy control entity. Furthermore, a method for operating a session management entity is provided and the corresponding session management entity. Additionally, a user plane entity is provided and the method for operating the user plane entity. Finally, a computer program comprising program code and a carrier comprising the computer program are provided and a system comprising at least two of the above-mentioned entities.

BACKGROUND

FIG. 1 shows a 5G New Radio, NR, architecture with service based interfaces in the Service Based Architecture (SBA). Service Based Interfaces are represented in the format Nxyz, such as Nsmf, and point to point interfaces in the format Nx, such as N4.

The 5G core network part comprises a Network Slice Selection Function (NSSF) 10, a Network Exposure Function (NEF) 15, a Network Repository Function (NRF) 20, a Policy Control Function (PCF) 25, a Unified Data Management (UDM) 30, an Application Function (AF) 35, an Authentication Server Function (AUSF) 40, an Access and Mobility Management Function (AMF) 45, and a Session Management Function (SMF) 50. Having service based interfaces in the 5G Core Control Plane (CP), implies that the Network Functions (NFs) in the 5G Core CP provide services that are consumed by other NFs in the 5G Core CP.

A User Equipment (UE) 60, is connected to the Radio Access Network (RAN) 65, wherein a User Plane Function (UPF) 70 is provided to connect the UE 60 to a Data Network (DN) 75.

SBA: In 5G core network architecture, the 'network elements' is made available through Application Programming Interfaces (APIs). These 'network elements', are defined as Network Functions (NFs), and the architecture where each NF offers one or more service to other NFs is called Service-Based Architecture, SBA.

FIG. 2 shows the 5G 5GC architecture for policy charging and analytics. In addition to the nodes or functions shown in FIG. 1, the Unified Data Repository (UDR), 80 and the Network Data Analytics Function (NWDAF) 85, and the Charging Function 90 are provided.

The Charging Function (CHF) 90 supports offline and online charging functionality and exposes the Nchf interface towards the consumers (e.g. SMF).

In the following, some of the functions or notes are explained in more detail which are relevant for the understanding of the invention.

The Policy Control Function (PCF) 25 supports unified policy framework to govern the network behavior. Specifically, PCF provides PCC 25 (Policy and Charging Control) rules to the SMF 50.

The Session Management function SMF 50 supports different functionality, e.g. Session Establishment, modify and release, and policy related functionalities like termination of interfaces towards Policy control functions, Charging data collection, support of charging interfaces and control and coordination of charging data collection at UPF 70.

Specifically, SMF 50 receives PCC rules from PCF and configures UPF 70 accordingly through N4 reference point (PFCP protocol) as follows:

SMF 50 controls the packet processing in the UPF 70 by establishing, modifying or deleting PFCP Sessions and by provisioning (i.e. adding, modifying or deleting) PDRs (Packet Detection Rules), FARs (Forwarding Action Rules), QERs (Quality-of-Service Enforcement Rules) and/or URRs (Usage Reporting Rules) per PFCP session, whereby a PFCP session may correspond to an individual PDU session or a standalone PFCP session not tied to any PDU session.

Each PDR contains a PDI (Packet Detection Information) specifying the traffic filters or signatures against which incoming packets are matched. Each PDR is associated to the following rules providing the set of instructions to apply to packets matching the PDI:
   one FAR, which contains instructions related to the processing of the packets, specifically forward, duplicate, drop or buffer the packet with or without notifying the CP (Control Plane) function about the arrival of a DL packet.
   zero, one or more QERs, which contains instructions related to the Quality-of-Service enforcement of the traffic;
   zero, one or more URRs, which contains instructions related to traffic measurement and reporting.

The User Plane function UPF 70 supports handling of user plane traffic based on the rules received from SMF, specifically, packet inspection (through PDRs) and different enforcement actions, e.g. Quality of Service (throttling, optimization, shaping, etc.), Charging/Reporting, etc. through FARs, QERs, URRs.

In the cellular networks, there has been introduced a control and user plane separation, CUPS, but this separation has several drawbacks:

In case the UPF 70 applies a Quality-of-Service enforcement action to a certain traffic in the user's PDU session, there are situations where it is not possible for the SMF 50 to determine which traffic has been subject of a Quality-of-Service enforcement action, especially for charging and reporting purposes. By way of example, if video traffic is subject to adaptive bit rate, ABR, shaping based on the congestion level, the SMF will not be able to apply a different RG for charging the video traffic which has effectively been subject to ABR shaping at congestion compared to the video traffic to which there has been no ABR shaping when there is no congestion.

SUMMARY

Accordingly, a need exists to overcome the above-mentioned problems and to provide the possibility to apply different policy rules in dependence on the handling of a data packet session which influences the provided Quality of Service.

This need is met by the features of the independent claims. Further aspects are described by the dependent claims.

According to a first aspect, a method for operating a policy control entity is provided in a cellular network. According to the method, the policy control entity receives subscriber data comprising a policy with an indication that a conditional Quality-of-Service handling is to be applied to a data packet session exchanged between a user equipment of a subscriber and an application in dependence on at least one condition. The subscriber data furthermore comprise a charging indication used for charging the subscriber for the data packet session in dependence on the fact whether the conditional Quality-of-Service handling has been applied to the data packet session. The policy control entity furthermore generates a policy and charging rule for the data packet session wherein this rule comprises the conditional Quality-of-Service handling of the data packet session in dependence on the condition and the charging of the subscriber in dependence on the fact whether the conditional Quality-of-Service handling has been applied or not. The generated policy and charging rule is then transmitted to a session management entity of the cellular network which is configured to manage the data packet session in the cellular network.

Furthermore, the corresponding policy control entity is provided comprising a memory and at least one processing unit wherein the memory contains instructions executable by the at least one processing unit. The policy control entity is operative to work as discussed above or as discussed in further detail below.

As an alternative, a policy control entity is provided in a cellular network comprising a first module configured to receive subscriber data comprising a policy with an indication that the conditional Quality-of-Service handling is to be applied to the data packet session exchanged between a user equipment of a subscriber and an application in dependence on at least one condition. The subscriber data further comprise a charging indication used for charging the subscriber for the data packet session in dependence on the fact whether the conditional Quality-of-Service handling has been applied to the data packet session. A second module of the policy control entity is configured to generate a policy and charging rule for the data packet session wherein this policy and charging rule comprises the conditional Quality-of-Service handling of the data packet session in dependence on the condition and the charging of the subscriber in dependence on the fact whether the conditional Quality-of-Service handling has been applied or not. A third module is configured to transmit the generated policy and charging rule to the session management entity of the cellular network which is configured to manage the data packet session in the network.

Accordingly, the policy control entity can generate a policy and charging rule which can form the basis for the conditional application of a Quality-of-Service handling together with the charging in dependence on the fact whether the Quality-of-Service handling has been applied to the data packet session or not. The policy control entity can request the session management entity to activate this feature.

Furthermore, a method for operating a session management entity is provided which is configured to manage a data packet session in a cellular network. The session management entity receives a policy and charging rule for a data packet session from the policy control entity wherein the policy and charging rule indicates a conditional Quality-of-Service handling to be applied to the data packet session exchanged between a user equipment of a subscriber and an application in dependence on at least one condition, wherein the policy and charging rule indicates that the subscriber is to be charged for the data packet session in dependence on the fact whether the conditional Quality-of-Service handling has been applied to the data packet session or not. The session management entity determines a user plane entity which is configured to handle data packet session in the cellular network and which is configured to apply the policy and charging rule indicating the conditional Quality-of-Service handling to the data packet session. Furthermore, the session management entity transmits a session establishment request to the determined user plane entity wherein this request requests the determined user plane entity to enforce the conditional Quality-of-Service handling when the at least one condition is met, wherein the session establishment request furthermore requests the user plane entity to report the handling of the data packets in the data packet session in dependence on the fact whether the Quality-of-Service handling has been applied to the data packets of the data packet session or not.

Furthermore, the corresponding session management entity is provided comprising a memory and at least one processing unit, wherein the memory contains instructions executable by the at least one processing unit, wherein the session management entity is configured to work as discussed above or as discussed in further detail below.

As an alternative, a session management entity is provided comprising a first module configured to receive a policy and charging rule for a data packet session from a policy control unit, wherein the policy and charging rule indicates a conditional Quality-of-Service handling to be applied to the data packet session exchanged between a user equipment of a subscriber and an application in dependence on at least one condition. The policy and charging rule furthermore indicates that the subscriber is to be charged for the data packet session in dependence on the fact whether the conditional Quality-of-Service handling has been applied to the data packet session or not. A second module of the session management entity is configured to determine a user plane entity which is configured to handle the data packet session in the network and which is configured to apply the policy and charging rule indicating the conditional Quality-of-Service handling to the data packet session. A third module is provided configured to transmit a session establishment request to the determined user plane entity wherein this session establishment request requests the determined user plane entity to enforce the conditional Quality-of-Service handling when the at least one condition is met. The session establishment request furthermore requests the user plane entity to report the handling of the data packets of the data packet session in dependence on the fact whether the Quality-of-Service handling has been applied to the data packets of the data packet session or not.

With this method the session management entity can first of all select a user plane entity which is supporting this Quality-of-Service dependent actions and which can activate this handling of a data packet session in the user plane entity by transmitting the corresponding session establishment request including the required information.

Furthermore, a method for operating a user plane entity is provided which is configured to handle a data packet session in a cellular network wherein the user plane entity receives a session establishment request which requests the user plane entity to enforce a conditional Quality-of-Service handling when at least one condition is met. The session establishment request furthermore requests the user plane entity to report the handling of data packets of the data packet session in dependence on the fact whether the Quality-of-Service handling has been applied to the data packets of the data packet session or not. The user plane entity furthermore detects data packets of the data packet session and determines whether the at least one condition of the session establishment request is met. If this is the case, it applies the Quality-of-Service handling to the data packets when the at least one condition is met and determines an amount of data packets to which the Quality-of-Service handling has been applied and the amount of data packets to which the Quality-of-Service handling has not been applied. Furthermore, it transmits a session report to the session management entity which includes an indication about at least one of an amount of the data packets to which the Quality-of-Service handling has been applied and an amount of the data packets of the data packet session to which the Quality-of-Service handling has not been applied.

Furthermore, the corresponding user plain entity is provided comprising a memory and at least one processing unit wherein the memory contains instructions executable by the at least one processing unit wherein the user plane entity is operative to work as discussed above or as discussed in further detail below.

As an alternative, a user plane entity is provided comprising a first module configured to receive the session establishment request which requests the user plane entity to enforce a conditional Quality-of-Service handling when at least one condition is met. The session establishment request furthermore requests the user plane entity to report the handling of data packets of the data packet session in dependence on the fact whether the Quality-of-Service handling has been applied to the data packets or not. A second module of the user plane entity is configured to detect the data packets of the data packet session and a third module is configured to determine whether the at least one condition of the session establishment request is met or not. If the condition is met, a fourth module is configured to determine whether the at least one condition of the session establishment request is met. A fifth module is configured to apply the Quality-of-Service handling to the data packets when the at least one condition is met and a sixth module is configured to determine the amount of data packets to which the Quality-of-Service handling has been applied and to which the Quality-of-Service handling has not been applied. A sixth module is configured to transmit a session report to the session management entity which includes an indication about at least one of the amount of data packets to which the Quality-of-Service handling has been applied and an amount of packets to which the Quality-of-Service handling has not been applied.

The user plane entity, as instructed by the session management entity, detects the traffic subject to the conditional Quality-of-Service handling and, if the at least one condition is met, the Quality-of-Service handling is applied and depending on the application of the Quality of Service a charging information is generated.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

BRIEF DESCRIPTION OF THE DRAWINGS

The foregoing and additional features and effects of the application will become apparent for a person skilled in the art from the following detailed description when read in conjunction with the accompanying drawings, in which like reference numerals refer to like elements.

FIG. 3 shows an example implementation how a user plane entity informs a session management entity that it is able to report based on a conditional Quality-of-Service application.

FIG. 4 shows an example schematic implementation how in a session establishment request the user plane entity is asked to apply the conditional Quality-of-Service application.

FIG. 5 shows an example schematic implementation of a usage report transmitted by a user plane entity applying the conditional Quality-of-Service handling of data packets.

FIG. 6 shows an example schematic implementation of a report of the amount of data packets to which the Quality-of-Service handling has been applied.

DETAILED DESCRIPTION OF DRAWINGS

Figure 1:
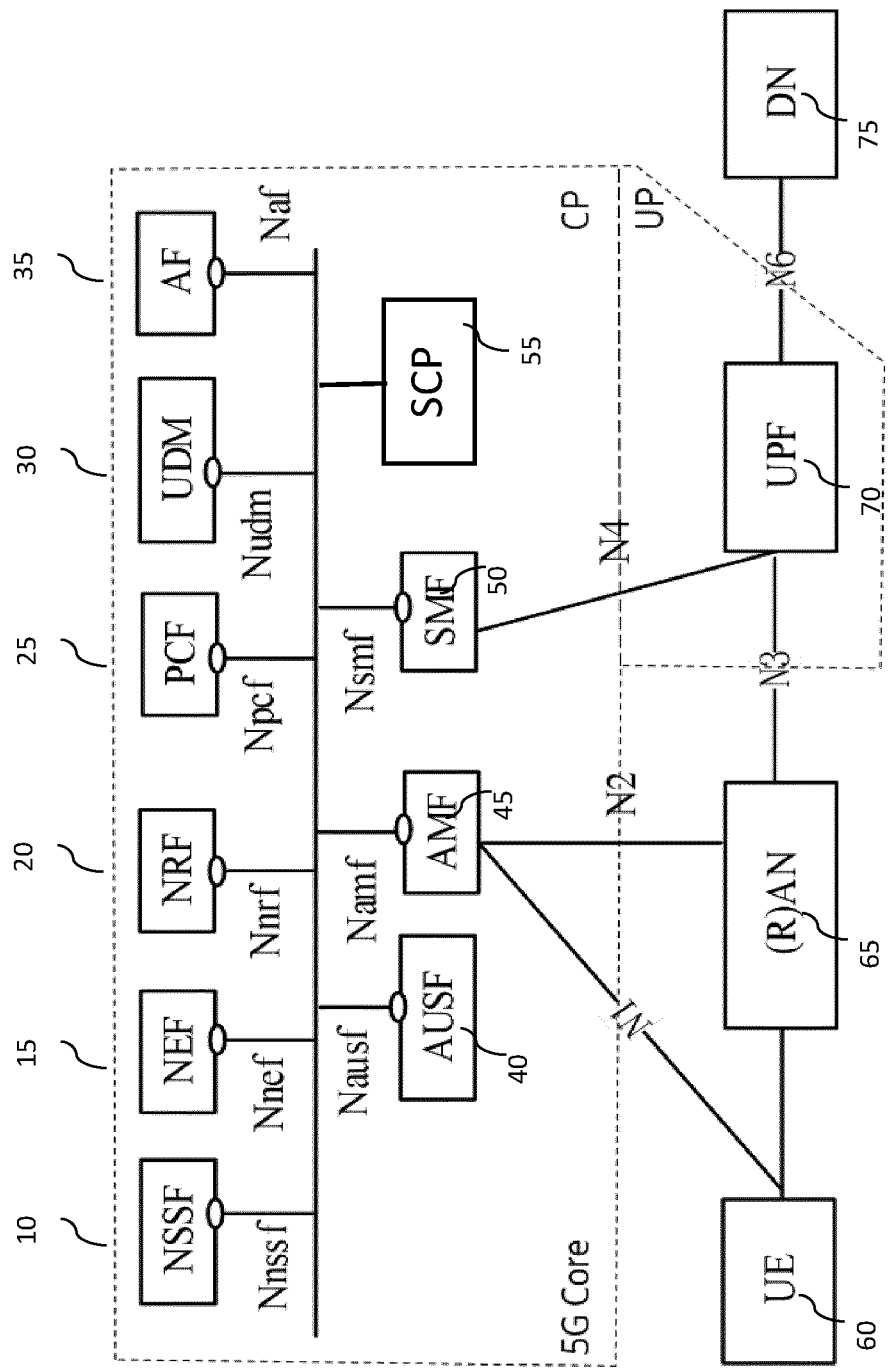
FIG. 1 shows a schematic architectural view of the network architecture in a 5G network as known in the art.
Figure 2:
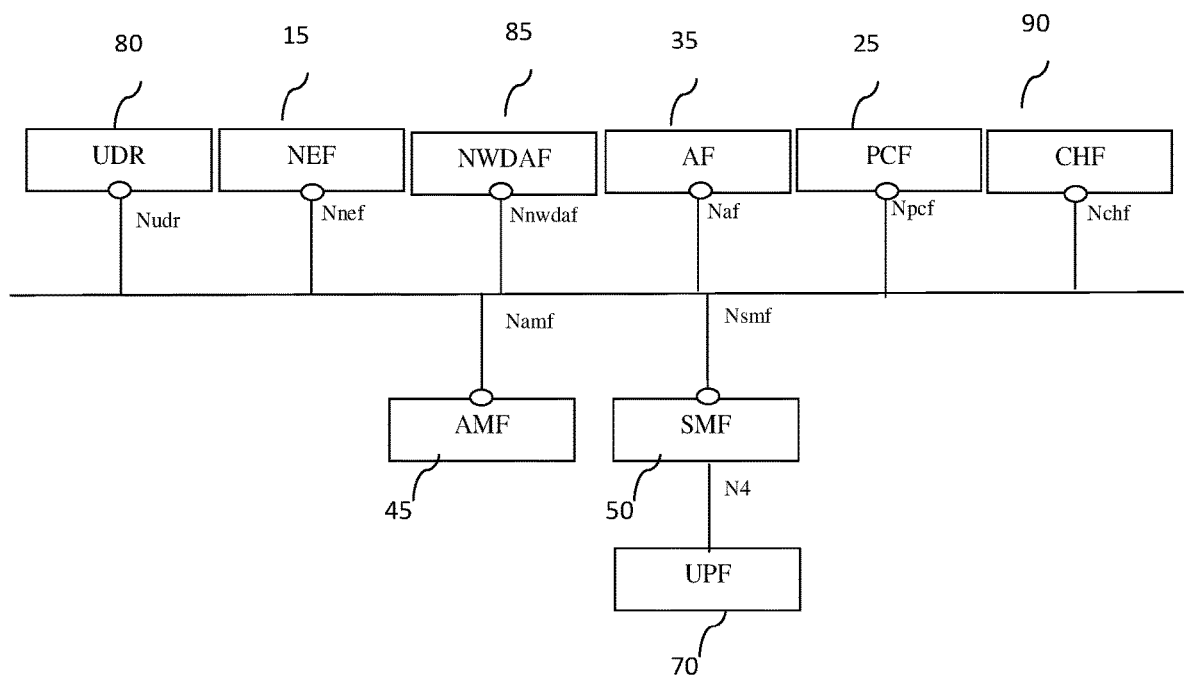
FIG. 2 shows a schematic architectural view of the network architecture used for policy, charging and analytics in a 5G environment as known in the art.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Within the context of the present application, the term "mobile entity" or "user equipment" (UE) refers to a device for instance used by a person (i.e. a user) for his or her personal communication. It can be a telephone type of device, for example a telephone or a Session Initiating Protocol (SIP) or Voice over IP (VoIP) phone, cellular telephone, a mobile station, cordless phone, or a personal digital assistant type of device like laptop, notebook, notepad, tablet equipped with a wireless data connection. The UE may also be associated with non-humans like animals, plants, or machines. A UE may be equipped with a SIM (Subscriber Identity Module) or electronic-SIM comprising unique identities such as IMSI (International Mobile Subscriber Identity), TMSI (Temporary Mobile Subscriber Identity), or GUTI (Globally Unique Temporary UE Identity) associated with the user using the UE. The presence of a SIM within a UE customizes the UE uniquely with a subscription of the user.

For the sake of clarity, it is noted that there is a difference but also a tight connection between a user and a subscriber. A user gets access to a network by acquiring a subscription to the network and by that becomes a subscriber within the network. The network then recognizes the subscriber (e.g. by IMSI, TMSI or GUTI or the like) and uses the associated subscription to identify related subscriber data. A user is the actual user of the UE, and the user may also be the one owning the subscription, but the user and the owner of the subscription may also be different. E.g. the subscription owner may be the parent, and the actual user of the UE could be a child of that parent.

In the following, a solution is discussed which proposes a mechanism which allows a network operator to apply differentiated charging or reporting based on Quality-of-Service actions which were applied by a user plane entity.

In the following description, the expressions "entity" and "function" are used interchangeably so that the user plane function corresponds to the user plane entity, the session management entity corresponds to the session management function and the policy control entity corresponds to the policy control function.

In the network, a feature which requires a conditional Quality-of-Service handling can be enabled or disabled on a per-subscriber, on a per-group of subscribers, on a global network basis or on a DNN basis. As an example for the conditional Quality-of-Service handling, one can imagine the ABR (Adaptive Bitrate Shaping) shaping based on congestion or a shaping based both on congestion and large flow detection. The conditional Quality-of-Service handling can also be enabled or disabled on a per-application basis, by way of example, for a certain application, such as for Netflix traffic or for a set of applications. In the association procedure, by way of example, in a PFCP (Packet Forwarding Control Protocol) association the user plane entity reports to the session management entity a new capability, here the reporting based on the Quality-of-Service action. This allows the SMF to select a UPF supporting this capability on a per-session basis.

Other examples of the Quality-of Service handling include throttling, (e.g. using leaky bucket or token bucket algorithms, setting up bearers with a certain QCI (QoS class identifier) where the RAN scheduler will prioritize based on QCI.

When the user triggers a session establishment, by way of example, a PDU session, a policy control entity can request the SMF based on the subscriber policy profile in the UDR to activate a feature which requires a conditional Quality-of-Service handling. The feature could be a rule such as ABR shaping based on congestion or shaping based on congestion and large flow detection. The SMF can trigger the following action towards the UPF:

the SMF selects a UPF which supports this capability, namely the reporting based on the Quality-of-Service action, the SMF triggers a session towards the UPF, by way of example, a PFCP session, to activate a feature which requires a conditional Quality-of-Service handling and especially requests the UPF to report to the SMF based on the Quality-of-Service action which has been effectively applied to the data packets.

When the PDU session is established, the following may happen:

When the user runs the application traffic, the UPF detects the traffic subject to conditional Quality-of-Service handling and in case the condition or the conditions are met, by way of example, there is congestion and there is a large flow, the UPF applies the corresponding Quality-of-Service action such as the traffic shaping.

The UPF can periodically or upon request report to the SMF the volume as follows, by way of example, in a PFCP session report:

the volume of traffic where the Quality-of-Service action has been effectively applied, by way of example, when there is the congestion and when there is the large flow. Additionally, it is possible to differentiate the volume based on the congestion level such as low congestion, medium congestion or high congestion. This means that the condition may not be a binary condition but a condition having different values, more than two, and depending on the identified value or values the Quality-of-Service handling is applied or not.

The volume of the traffic where the Quality-of-Service action has not been effectively applied such as when there is no congestion or when there is no large flow.

In the following, an example is discussed in connection with FIGS. 7 and 8 wherein in FIGS. 3, 4, 5 and 6 an implementation is shown for a PFCP protocol, packet flow control protocol. However, any other implementation is also possible.

Figure 7:
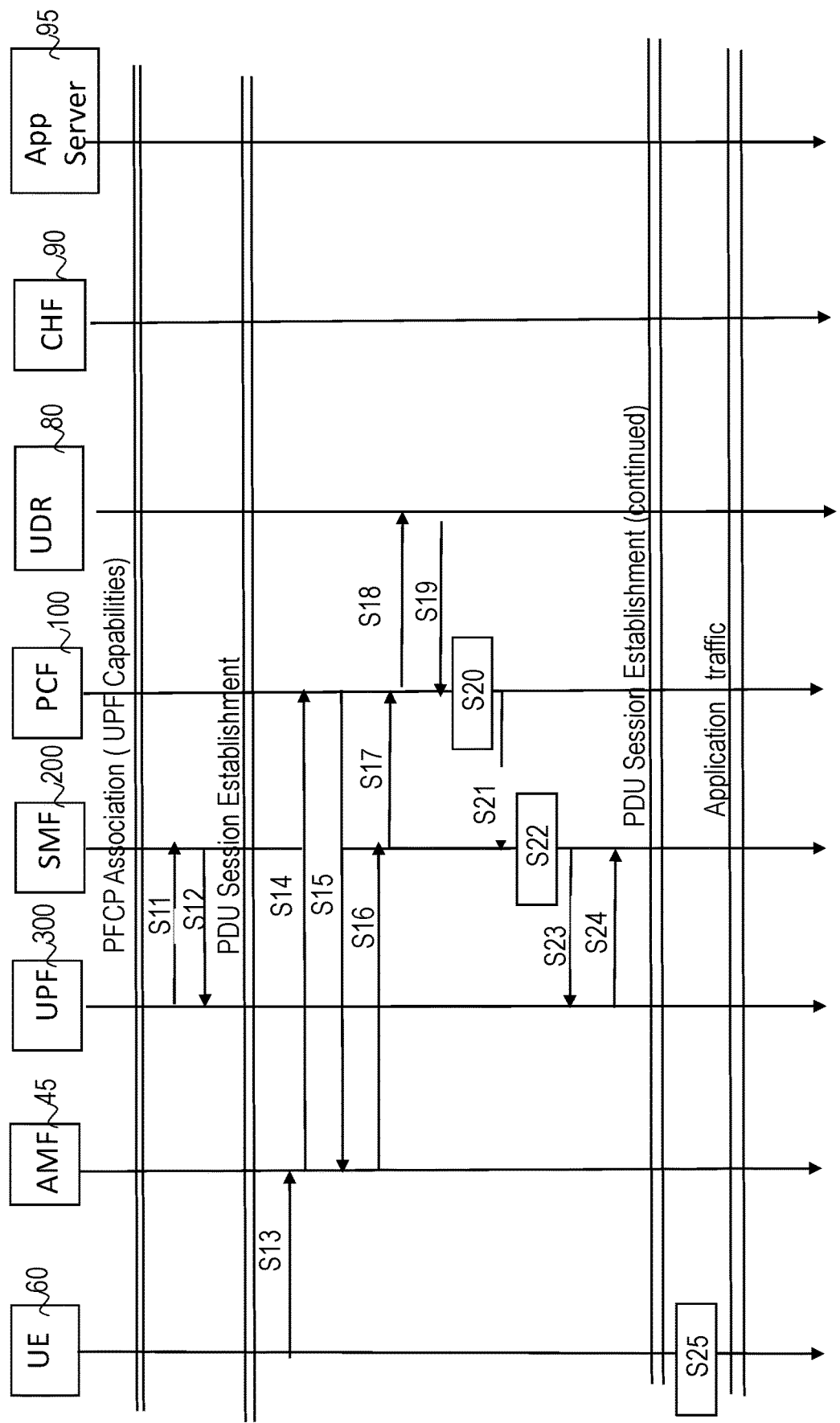
FIG. 7 shows a first part of an example message exchange between the entities involved for a conditional Quality-of-Service application.
Figure 8:
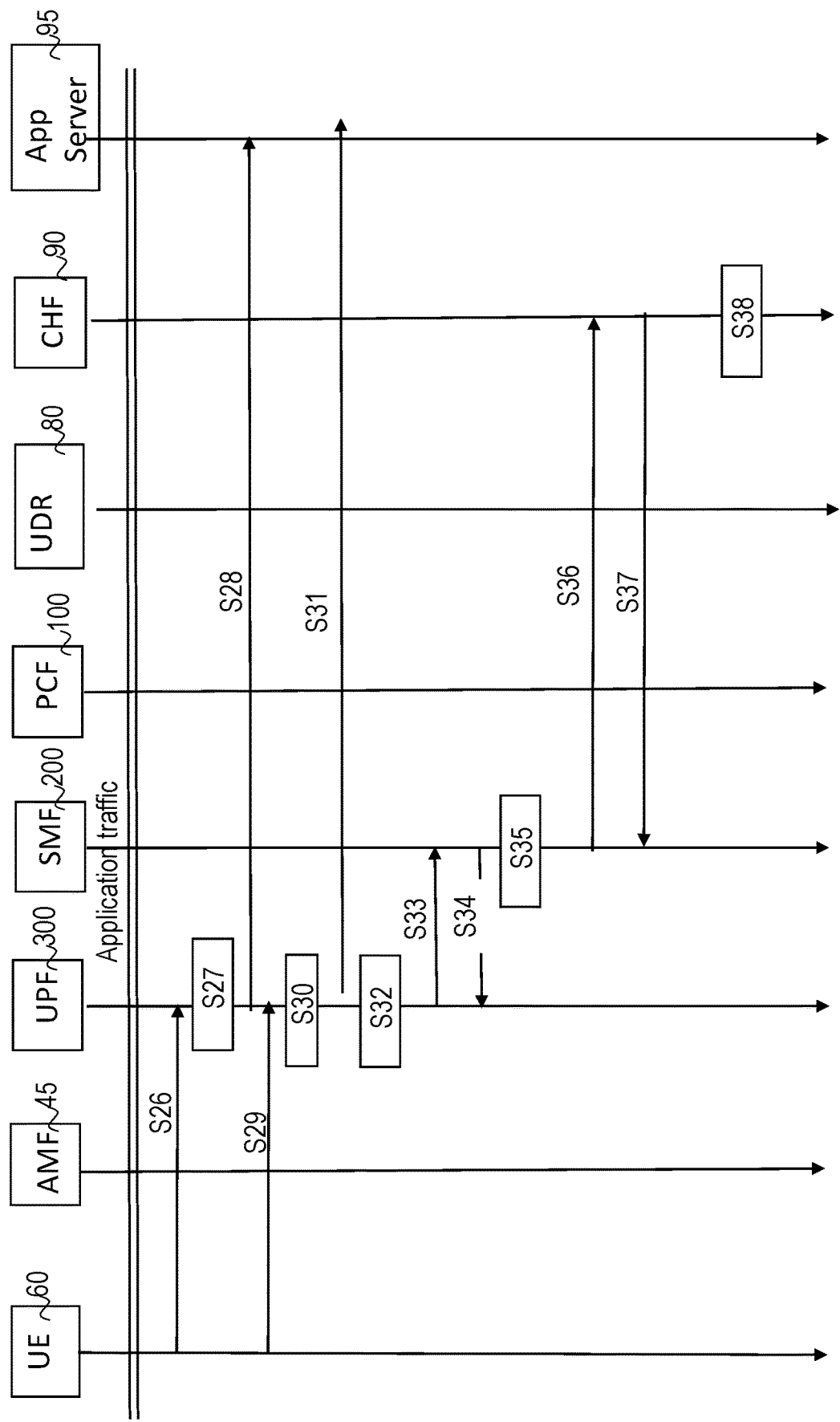
FIG. 8 shows a second part of the message exchange of FIG. 7 between the involved entities.

The sequence diagram shown in FIGS. 7 and 8 illustrates the solution for a scenario in which a certain subscriber requests a data packet session for a certain application, by way of example Netflix, and a large flow shaping under congestion policy is to be applied and when the subscriber's quota should not be deduced when the shaping is applied.

In the example shown, a policy for a certain application such as Netflix is preconfigured in the UDR as subscriber policy data, here the example that shaping is to be applied to large flows when there is congestion and to avoid the charging of the end-user for the shaped traffic. This policy might apply on a per-subscriber, on a per-group of subscribers, on a per-network basis or on a per-application basis.

In the following, the parts in brackets indicate the PFCP implementation. Steps S11 (PFCP Association Request) and S12 (PFCP Association Response) between UPF 300 and SMF 200 entities, it is proposed to extend the existing mechanism to report UPF capabilities with a new capability (Reporting based on Quality-of-Service action: RQOS, see Table in FIG. 3 in bold). This would allow SMF 200 to know which UPFs support this capability and thus can influence on UPF selection.

Step S13 (PDU Session Establishment Request) UE 60 triggers PDU session establishment, by means of sending a PDU Session Establishment Request to AMF. Note the sequence diagram in FIGS. 7 and 8 does not include all the signaling messages involved in the PDU Session Establishment procedure. The relevant signaling messages are described in subsequent steps.

Step S14 (Npcf_AMPolicy Association Request) AMF 45 selects a PCF and runs the AM Policy Association procedure by triggering a Npcf_AMPolicyAssociation Request message including the UE identifier (UEID) and the RAT (Radio Access Technology) Type.

Step S15 (Npcf_AMPolicy Association Response) PCF 100 answers AMF with a Npcf_AMPolicyAssociation Response message.

Step S16 (Nsmf PDU Session Create) AMF 45 selects an SMF to manage the PDU session and triggers Nsmf PDU Session Create message.

Step S17 (Npcf_SMPolicyControl_Create Request) SMF 200 selects a PCF 100 and triggers Npcf_SMPolicy Control_Create Request message to retrieve SM policies for the user PDU session.

Step S18 (Nudr_Query Request) PCF 100 triggers Nudr_Query Request message to retrieve the policy data for this user's PDU session.

Step S19 (Nudr_Query Response) UDR 80 answers with Nudr_Query Response message including the Subscriber Policy Data, which includes the following policy:
  appId=Netflix
  Quality-of-Service policy: shaping, but only to be applied to large flows at congestion. Additionally, the shaping level is based both on the congestion level and RAT Type
  Charging policy: the user should be charged for Netflix traffic as follows:
    For the shaped traffic, charge as RG (Rating Group) X (free of charge, e.g. not to deduct from the user's monthly quota).
    For the non-shaped traffic, charge as RG Y.

Steps S20 and S21 based on the above Netflix policy, PCF triggers a PCC rule for Netflix application, including the same elements above (copied again):
  PCC rule #N
  appId=Netflix
  Quality-of-Service policy: shaping, but only to be applied to large flows at congestion. Additionally, the shaping level is based both on the congestion level and RAT Type
  Charging policy: the user should be charged for Netflix traffic as follows:
    For the shaped traffic, charge as RG X (free of charge, e.g. not to deduct from the user's monthly quota).
    For the non-shaped traffic, charge as RG Y.

PCF 100 triggers towards SMF 200 a Npcf_SMPolicyControl_Create Response message including the above PCC rule #N and the RAT Type. It is proposed to extend the at Npcf_SMPolicyControl_Create Response message by defining new IEs to indicate both the Quality of Service and the Charging policy above.

Steps S22 and S23 (PFCP Session Establishment Request) SMF 200 selects a UPF 300 supporting reporting based on Quality-of-Service action (RQOS capability) and triggers a PFCP Session Establishment Request message including the following:
  RAT-Type
  PDR with PDI appId=Netflix, associated to the following rules:
    FAR (to forward the traffic matching the PDR)
    QER (shaping policy, but only to be applied to large flows at congestion, and where the shaping level is based both on the congestion level and RAT Type)
    URR (to report based on Quality-of-Service action applied). The following PFCP extension is proposed as shown in FIG. 4: adding a new flag (bit) in Measurement Information IE at "PFCP Session Establishment/Modification Request" in "Create/Update URR IE", as shown in bold.

As a PDR might be associated to several URRs, SMF 200 only needs to add the new Quality-of-Service flag (in Measurement Information IE) for the URRs that need to report the traffic on a per Quality-of-Service action basis.

In the sequence diagram of FIGS. 7 and 8 it is assumed there is an available UPF supporting the RQOS capability. Not shown in the sequence diagram of FIGS. 7 and 8, but in case there is no UPF supporting RQOS capability, SMF 100 will indicate that to PCF, so PCF knows that the RQOS policy cannot be met.

Step S24 (PFCP Session Establishment Response) UPF 300 acknowledges the request by triggering a PFCP Session Establishment Response message.

Step S25 After PDU Session Establishment, user opens an application (e.g. Netflix)

Step S26 Here the case is shown where UE sends Netflix application data, but two conditions are met:
  Traffic corresponds to a big flow (e.g. typically carrying a video stream), AND
  The cell is under congestion.

Steps S27 and S 28 UPF 300 detects application traffic based on PDR rules (specifically matches the PDR with PDI appId=Netflix) and it applies the following actions:
  Quality-of-Service action: shaping (as it is a big flow and there is congestion)
  Charging/Reporting action: UPF 300 stores the volume of traffic shaped in a separate container.

The specific algorithm to detect large flows may be preconfigured in UPF. Large flows use a high bandwidth during a long time. A way of detecting them is to identify flows that last longer than X1 milliseconds and in that time have transferred more than X2 Mbytes, as follows:
  Flow duration (of the TCP or UDP flow) is longer than X1 milliseconds, and
  The downloaded size in the first X1 seconds exceeds X2 Mbytes Where X1 and X2 values are proposed to be preconfigured in UPF based on typical network characteristics, including the RAT type. An example UPF configuration proposed below:
  upf large-flow-shaping
    select-detection-algorithm volume-threshold|<other-algorithm>
    detection-algorithm volume-threshold
      rat-type ["0" . . . "9", "102","103"]
        duration <X1 milliseconds>
        size <X2 Mbytes>

The specific algorithm to detect congestion is proposed to be preconfigured in UPF 300. It could be based on different metrics (e.g. TCP RTT, throughput metrics for UDP traffic, etc.)

The specific shaping algorithm may be preconfigured in UPF. The shaping mechanism can be used to reduce the bandwidth of flows identified as large flows. The applied bandwidth limitation value depends on the congestion level and can be made dependent on the RAT type. The shaping mechanism consists of 2 repeated time periods; Y2 where the shaping is applied and Y1 where the flow is allowed to transmit at full speed, as follows:

Periodical shaping: repetitive of Y1 seconds at peak rate (no shaping), Y2 seconds shaping rate (at Z Mbps). The Y1 and Y2 values are proposed to be configurable at UPF. The Z value can also be configurable at UPF and depending both on the congestion level and the RAT Type, an example UPF configuration proposed below:
upf large-flow-shaping
    congestion-level-from ["1" . . . "10"]
        rat-type ["0" . . . "9", "102","103"]
            shaping-bitrate <Z Mbps>
    select-shaping-algorithm intermittent-pacing|<other-algorithm>
    shaping-algorithm intermittent-pacing
        maximum-bitrate-period <Y1 seconds>
        pacing-period <Y2 seconds>

Step S29 Here the case is shown where UE sends Netflix application data, but only one of the following conditions are met:

Traffic does not correspond to a big flow (e.g. typically not carrying a video stream, but instead signaling for the application), OR The cell is NOT under congestion.

Steps S30 and S31 UPF 300 detects application traffic based on PDR rules (specifically matches the PDR with PDI appId=Netflix) and it applies the following actions:

Quality-of-Service action: No action (as it is either not a big flow or there is no congestion)

Charging/Reporting action: UPF stores the volume of traffic not shaped in a separate container.

Steps S32 to S34 When the URR threshold (e.g. periodic or volume threshold) is reached, UPF triggers a URR report including the volume shaped vs not shaped, if the URR includes the new Quality-of-Service flag in Step S23 above. Specifically, it is proposed to extend the PFCP protocol by adding a new Quality-of-Service Information IE (see in FIGS. 5 and 6 below in bold) in the Usage Report IE within PFCP Session Report Request message. (S33: PFCP Session Report Request)

Steps S35 to S 37 SMF 200 triggers online/offline charging including volume shaped and volume not shaped and the corresponding RG for charging. Specifically, SMF triggers a Nchf Charging Request including:

Shaped volume, RGX (free of charge, e.g. not to deduct from the user's monthly quota).

Not-shaped volume, RGY (S36: Nchf Charging Request, S37: Nchf Charging Response)

Step S38 CHF applies the corresponding logic (charging only for the not shaped Netflix volume)

Figure 9:
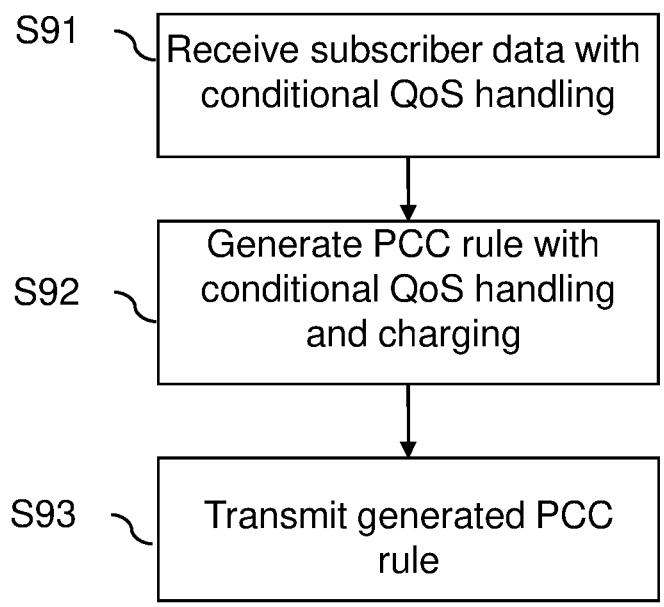
FIG. 9 shows an example flowchart of a method carried out by a policy control entity in the message exchange of FIGS. 7 and 8.

Finally, the solution described above does not only apply to 5G network architecture, but the same mechanisms can be applied to 4G, just by replacing:

PCF by PCRF
UDR by HSS (or a subscriber policy database)
AMF by MME
SMF by PGW-C or TDF-C
UPF by PGW-U or TDF-U FIG. 9 summarizes some of the steps carried out by the policy control entity 100 in the message exchange discussed above. In step S91, the policy control entity receives subscriber data which comprises a policy with the indication of the conditional Quality-of-Service handling. This was shown above in step S19 where the data are received from the UDR. In step S92, the policy control function then generates a policy and charging rule for the data packet session, wherein this rule comprises the conditional Quality-of-Service handling of data packets in dependence on the condition and the charging of the subscriber in dependence on the fact whether the conditional Quality-of-Service handling has been applied or not. This was discussed above in connection with step S20. In step S93, the generated policy and charging rule is transmitted to the session management entity 200 as mentioned above in step S21.

Figure 10:
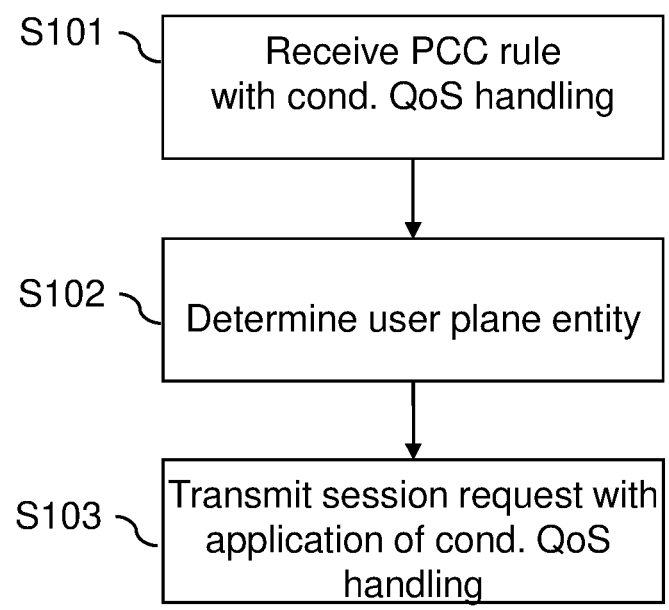
FIG. 10 shows an example flowchart of a method carried out by a session management entity in the message exchange of FIGS. 7 and 8.

FIG. 10 summarizes some of the steps carried out by the session management entity in the message exchange of FIGS. 7 and 8. In step S101, the SMF receives the policy and charging rule which was transmitted in step S93 or step S21. In step S102, the SMF 200 determines the user plane entity which is configured to apply the conditional Quality-of-Service handling as disclosed in step S22 above. In step S103, the SMF then transmits a session request with the application of the conditional Quality-of-Service handling to the UPF 300 as mentioned above in step S23.

Figure 11:
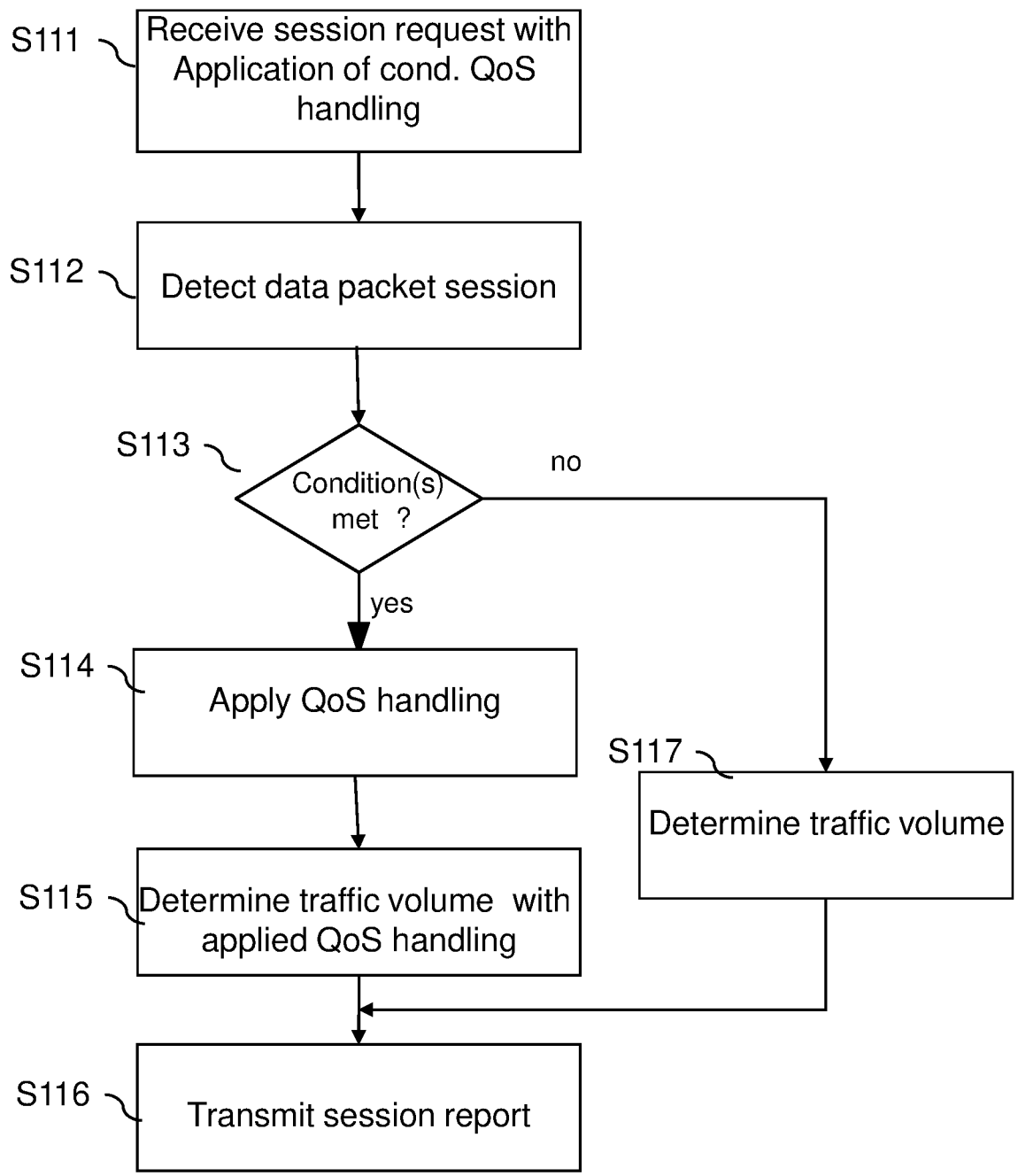
FIG. 11 shows an example flowchart of a method carried out by a user plane entity in the message exchange of FIGS. 7 and 8.

FIG. 11 summarizes some of the steps carried out by the user plane function 300 and a message exchange of FIGS. 7 and 8. In step S111, the user plane function receives the session request with the application of the Quality-of-Service handling under certain conditions meaning that the Quality-of-Service handling should be applied when one or several conditions are met. This was discussed in step S23 above.

In step S113, it is checked whether the condition is met. In the example of step S27, the UPF detects that the rule applies and applies the corresponding Quality-of-Service handling in step S114 or as mentioned in step S27. Furthermore, in step S115, it determines the traffic volume with the applied Quality-of-Service handling. This was discussed above in step S32 in more detail. When it is detected that the condition is not met, the traffic volume is determined in step S117 independent of the fact whether the Quality-of-Service handling has been applied or not. Finally, in step S116, the session report is transmitted as mentioned above in step S33 including a differentiation of the data packet to which the Quality-of-Service handling has been applied.

Figure 12:
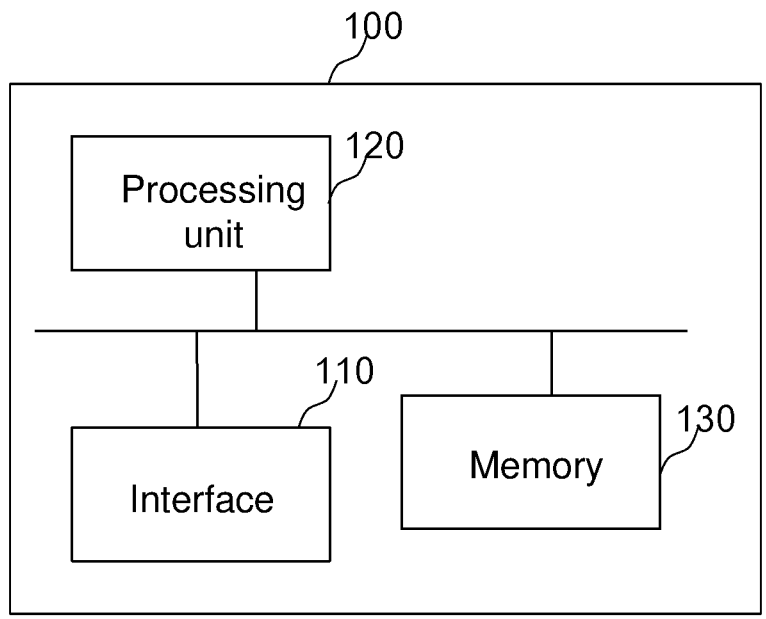
FIG. 12 shows an example schematic representation of a policy control entity configured to generate the policy rule with the conditional Quality-of-Service handling and configured to instruct the session management entity to apply the corresponding rule.

FIG. 12 shows a schematic architectural view of the policy control entity 100 which can carry out the above-discussed steps with the generation of the corresponding policy and charging rule. The policy control entity 100 is configured to generate the policy and charging rule needed for the conditional Quality-of-Service handling and comprises an interface 110 configured to transmit user data or control messages to other entities and configured to receive user data and control messages from other entities. The interface is configured to receive the subscriber data from the UDR and is configured to transmit the generated policy and charging rule to the session management entity. The policy control entity furthermore comprises a processing unit comprising one or more processors which can carry out instructions stored on a memory 130. The processing unit 120 may be responsible for the operation of the policy control entity 100. The memory may include a read-only memory, a random access memory, a mass storage, a hard disk or the like. The memory can furthermore include suitable program code to be executed by the processing unit 120 so as to implement the above-described functionalities in which the policy control entity is involved.

Figure 13:
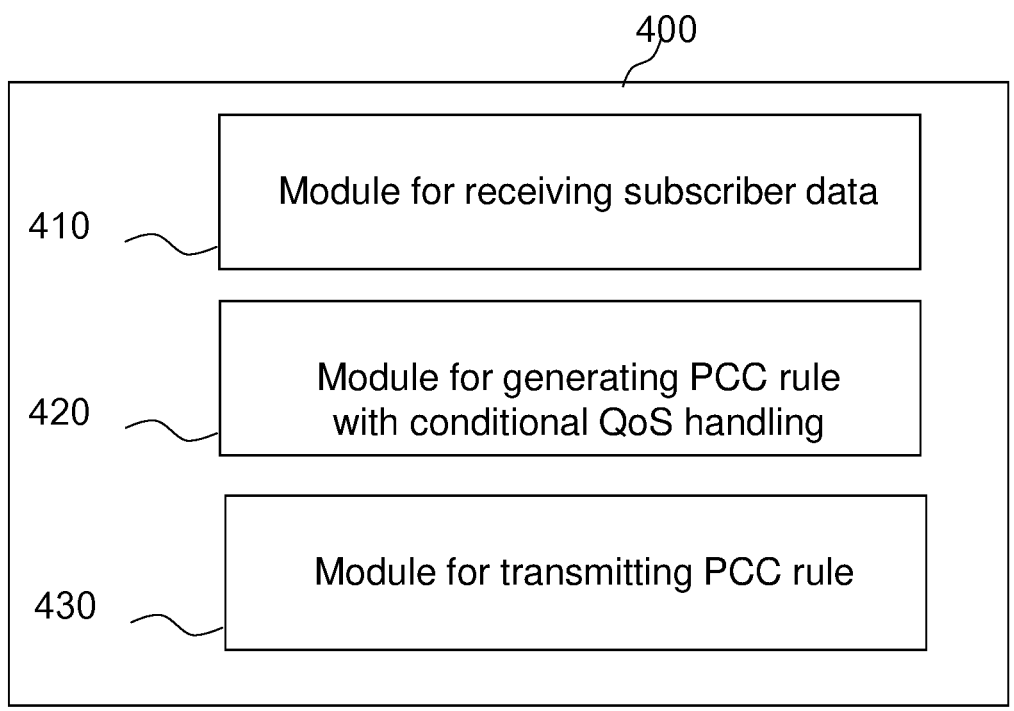
FIG. 13 shows another example schematic representation of the policy control entity shown in FIG. 12.

FIG. 13 shows a further example of a policy control entity comprising a first module 410 which is configured to receive the subscriber data which indicate the conditional Quality-of-Service handling and which indicate the charging indication in dependence on the fact whether the conditional Quality-of-Service handling has been applied or not. A module 420 is provided configured to generate the policy and charging rule which reflects the received subscription data so that the policy and charging rule indicates that the conditional Quality-of-Service handling should be carried out and that the charging should depend on the application of the Quality of Service. Furthermore, a module 430 is provided which is configured to transmit the generated policy and charging rule to the session management entity.

Figure 14:
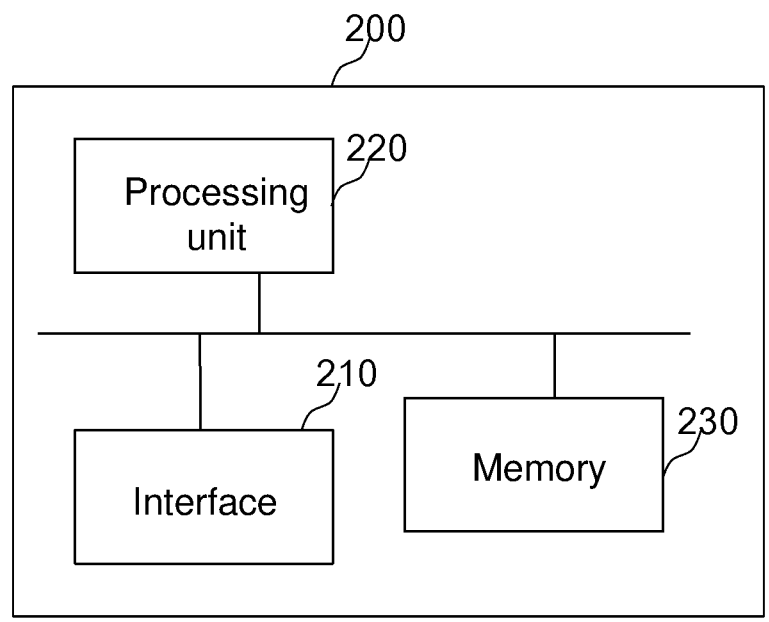
FIG. 14 shows an example schematic representation of the session management entity configured to transmit a session establishment request to a user plane entity requesting the user plane entity to enforce the conditional Quality-of-Service handling.

FIG. 14 shows an schematic architectural view of the session management entity which can operate as mentioned above in connection with FIGS. 7 and 8. The session management entity comprises an interface 210 provided for transmitting user data or control messages to other entities and configured to receive user data or control messages from other entities. By way of example, the interface 210 is configured to receive the policy and charging rule and is configured to transmit a session establishment request to a user plane entity which can handle the data packet session as required. The SMF furthermore comprises a processing unit 220 which is responsible for the operation of the SMF 200. The processing unit 220 can comprise one or more processors and can carry out instructions stored on a memory 230, wherein the memory may include a read-only memory, a random access memory, a mass storage, a hard disk or the like. The memory 230 can furthermore include suitable program code to be executed by the processing unit so as to implement the above-described functionalities in which the session management entity is involved.

Figure 15:
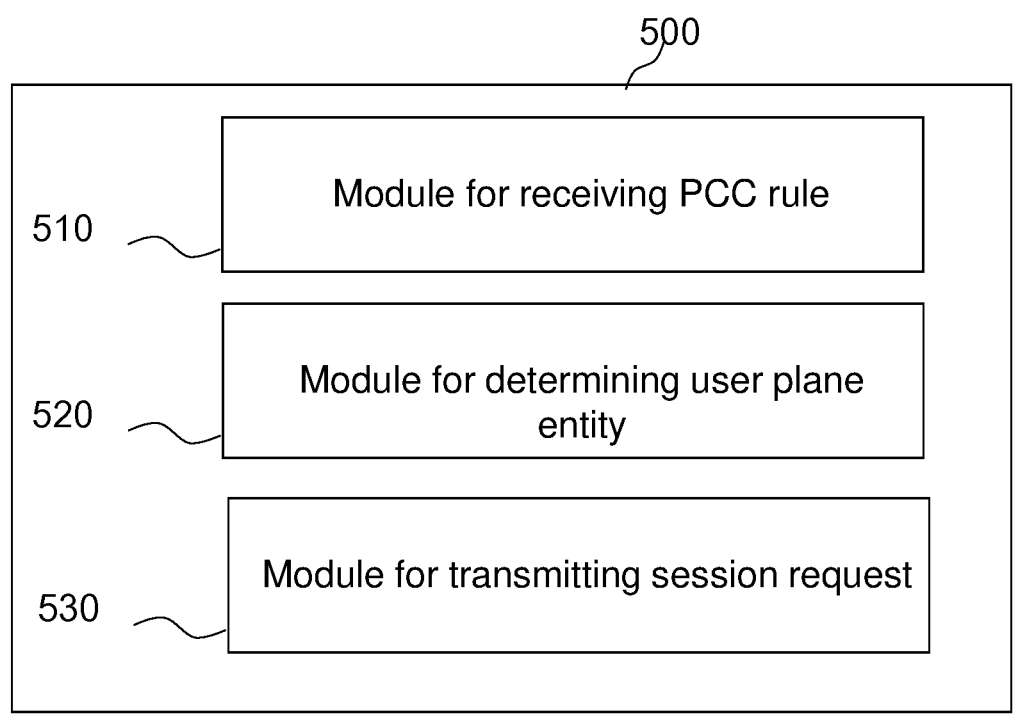
FIG. 15 shows another example schematic representation of the session management entity of FIG. 14.

FIG. 15 shows a further example schematic view of a session management entity 500 which comprises a first module 510 configured to receive the policy and charging rule with the conditional Quality-of-Service handling and with the charging information depending on the fact whether the conditional Quality-of-Service handling has been applied or not. A module 520 is provided configured to determine the user plane entity which can handle the data packet session as required. A module 530 is then configured to transmit the session request to the determined user plane entity wherein the session establishment request asks the user plane entity to enforce the conditional Quality-of-Service handling when at least one condition is met.

Figure 16:
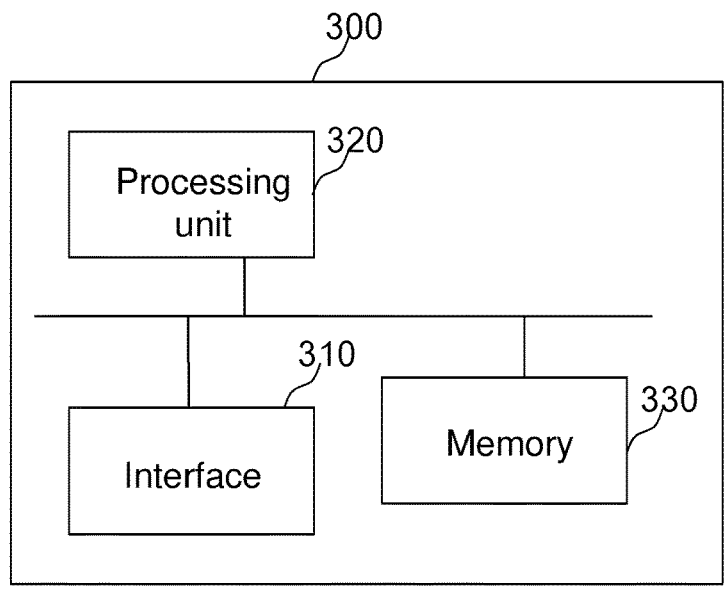
FIG. 16 shows an example schematic representation of a user plane entity configured to report the number of transmitted data packets for a data packet session depending on the application of a Quality-of-Service handling.

FIG. 16 shows an example schematic architectural view of the user plane entity which can apply the conditional Quality-of-Service handling and can report on the handling of the data packets depending on the application of the Quality of Service. The user plane entity comprises an interface 310 configured to receive user data or control messages. The interface can receive the session establishment request, the data packets of the data packet session and can transmit a session report with the indication to which of the data packets of the session the conditional Quality-of-Service handling has applied and to which not. The user plane entity furthermore comprises a processing unit 320 which is responsible for the operation of the user plane entity. The processing unit 320 can comprise one or more processors and can carry out instructions stored on the memory 330, wherein the memory may include a read-only memory, a random access memory, a mass storage, a hard disk or the like. The memory can furthermore include suitable program code to be executed by the processing unit 320 so as to implement the above-described functionalities in which the user plane entity is involved.

Figure 17:
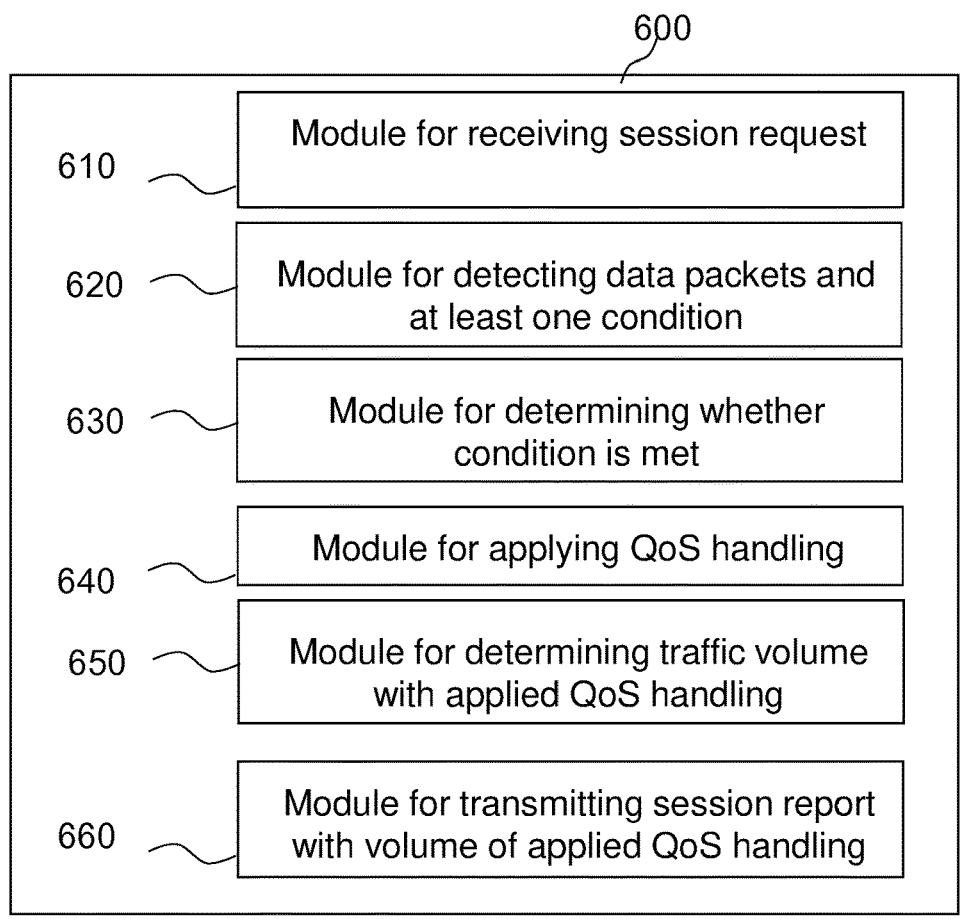
FIG. 17 shows another example schematic representation of the user plane entity of FIG. 16.

FIG. 17 shows a further architectural view of the user plane entity 600 comprising a first module 610 configured to receive the session establishment request which requests the user plane entity to enforce the conditional Quality-of-Service handling and which requests the user plane entity to report the handling in dependence on the fact whether the Quality-of-Service handling has been applied or not. A module 620 is configured to detect the data packets of the data packet session and a module 630 is configured to determine whether the at least one condition is met. A module 640 is configured to apply the Quality-of-Service handling when the condition is met and a module 650 is provided configured to determine the traffic volume or the amount of data packets to which the Quality-of-Service handling has been applied and to which the Quality-of-Service handling has not been applied. Finally, a module 660 is provided configured to transmit a session report to the SMF including the indication of the amount of data packets to which the Quality-of-Service handling has been applied and/or the amount of data packets to which the Quality-of-Service handling has not been applied.

From the above said some general conclusions can be drawn:

The at least one condition under which the Quality-of-Service handling should be applied can be a network dependent condition which influences the throughput of the data packets of the data packet session through the cellular network. Furthermore, the condition can be a pure network dependent condition and may not depend on the data packet itself.

The condition can be mainly a condition which influences how and to what extent the data packets are actually transmitted through the network.

Furthermore, the at least one condition for the application of the Quality-of-Service handling can comprise two different conditions, such as the presence of a large data packet flow and the presence of a congestion, and the policy and charging rule may indicate that the conditional Quality-of-Service handling should be only applied to the data packets if the two different conditions are met.

Preferably, the condition is independent of the information transmitted in the data packets of the data packet session.

These aspects relate to the policy control entity, but also to other entities such as the session management entity and the user plane entity.

As far as the session management entity is concerned, the session management entity can furthermore receive a session report including an indication about the amount of data packets to which the Quality-of-Service handling has been applied, or the amount of data packets to which the Quality-of-Service chaining has not been applied. Furthermore, it is possible that the report includes the indication of both amounts.

Based on the received session report, the session management entity can determine a charging information and the charging information may include a differentiation between the data packets of the data packet session to which the conditional Quality-of-Service handling has been applied and the data packets to which the conditional Quality-of-Service handling has not been applied. The determined charging information can furthermore be transmitted to a charging entity which is configured to charge for the transmission of data packets in the network.

As far as the user plane entity is concerned, the transmitted session report can comprise the indication about the amount of data packets to which the Quality-of-Service handling has been applied and/or the amount of the data packets of the data packet session to which the Quality-of-Service handling has not been applied. The conditional Quality-of-Service handling can comprise a reduction of the bandwidths provided for the data packet session for transmitting the data packets of the session through the cellular network.

Before the session establishment request is received, the session management entity can be informed by the user plane entity of the fact that the user plane entity has the capability to carry out the conditional Quality-of-Service handling.

When the at least one condition is met, the Quality-of-Service handling of the conditional Quality-of-Service handling is applied to the data packets of the data packet session.

The conditional Quality-of-Service handling can include the feature of a traffic shaping applied to the data packet session.

The above-discussed solution has several advantages:

It allows the operator of the network to differentiate user application traffic which has been subject to Quality-of-Service enforcement actions from the traffic where the Quality-of-Service enforcement action has not been applied. This information can be used for reporting and/or for charging purposes to provide a faster and a more proactive response to complaints e.g. from customers.

Furthermore, it allows the network operator to avoid charging the end user in case the network is congested and Quality-of-Service actions are applied.

The end user will not have its quota deducted when shaping or any other Quality-of-Service handling influencing the Quality of Experience (QoE) is applied as this would not be fair under the congested situation where the user's quality of experience is degraded and the user will be equally charged for it as compared to the situation where no congestion occurs.

Furthermore, it allows the network operator to enable the proposed mechanism with different levels of granularity. The application can be on a per-application, per-subscriber, per-group of subscribers, or on a per-node basis.

Finally, it allows the network operator to simplify the provisioning and to reduce the number of the rules to classify the traffic which results in a performance improvement.

The invention claimed is:

1. A method for operating a policy control entity in a cellular network, the method comprising:
  receiving subscriber data comprising a policy with an indication that a conditional Quality-of-Service handling is to be applied to a data packet session exchanged between a user equipment of a subscriber and an application in dependence on at least one condition, the subscriber data further comprising a charging indication used for charging the subscriber for the data packet session in dependence on the fact whether the conditional Quality-of-Service handling has been applied to the data packet session;
  generating a policy and charging rule for the data packet session, the policy and charging rule comprising the conditional Quality-of-Service handling of the data packet session in dependence on the condition and the charging of the subscriber in dependence on the fact whether the conditional Quality-of-Service handling has been applied or not; and
  transmitting the generated policy and charging rule to a session management entity of the cellular network configured to manage the data packet session in the cellular network.

2. The method according to claim 1, wherein the at least one condition is a network dependent condition influencing a throughput of data packets of the data packet session through the cellular network.

3. The method according to claim 1, wherein the at least one condition comprises two different conditions, the generated policy and charging rule indicating that the conditional Quality-of-Service handling is only to be applied to the data packet session if the two different conditions are met.

4. The method according to claim 1, wherein the at least one condition is independent of information transmitted in the data packets of the data packet session.

5. A method for operating a session management entity configured to manage a data packet session in a cellular network, the method comprising:
  receiving a policy and charging rule for a data packet session from a policy control unit, the policy and charging rule indicating a conditional Quality-of-Service handling to be applied to the data packet session exchanged between a user equipment of a subscriber and an application in dependence on at least one condition, the policy and charging rule indicating that the subscriber is to be charged for the data packet session in dependence on the fact whether the conditional Quality-of-Service handling has been applied to the data packet session or not;
  determining a user plane entity configured to handle the data packet session in the cellular network and configured to apply the policy and charging rule indicating the conditional Quality-of-Service handling to the data packet session; and
  transmitting a session establishment request to the determined user plane entity, the session establishment request requesting the determined user plane entity to enforce the conditional Quality-of-Service handling when the at least one condition is met, the session establishment request further requesting the user plane entity to report the handling of the data packets of the data packet session in dependence whether the Quality-of-service handling has been applied to the data packets of the data packet session or not.

6. The method according to claim 5, further comprising receiving a session report including an indication about at least one of an amount of the data packets to which the Quality-of-Service handling has been applied and an amount of the data packets of the data packet session to which the Quality-of-Service handling has not been applied.

7. The method according to claim 6, further comprising determining charging information based on the received session report, wherein the charging information includes a differentiation between data packets of the data packet session to which the conditional Quality-of-Service handling has been applied and the data packets of the data packet session to which the conditional Quality-of-Service handling has not been applied, wherein the determined charging information is transmitted to a charging entity configured to charge for a transmission of the data packets.

8. The method according to claim 5, wherein the at least one condition is a network dependent condition influencing a throughput of data packets of the data packet session through the cellular network.

9. The method according to claim 5, wherein the at least one condition is independent of information transmitted in the data packets of the data packet session.

10. A method for operating a user plane entity configured to handle a data packet session in a cellular network, the method comprising:
- receiving a session establishment request, the session establishment request requesting the user plane entity to enforce a conditional Quality-of-Service handling when at least one condition is met, the session establishment request further requesting the user plane entity to report the handling of data packets of the data packet session in dependence on whether the Quality-of-Service handling has been applied to the data packets of the data packet session or not;
- detecting data packets of the data packet session;
- determining whether the at least one condition of the session establishment request is met;
- applying the Quality-of-Service handling to the data packets when the at least one condition is met;
- determining an amount of data packets to which the Quality-of-Service handling has been applied and to which the Quality-of-Service handling has not been applied; and
- transmitting a session report to a session management entity including an indication about at least one of an amount of the data packets to which the Quality-of-Service handling has been applied and an amount of the data packets of the data packet session to which the Quality-of-Service handling has not been applied.

11. The method according to claim 10, wherein the transmitted session report comprises the indication about the amount of the data packets to which the Quality-of-Service handling has been applied and the amount of the data packets of the data packet session to which the Quality-of-Service handling has not been applied.

12. The method according to claim 10, wherein the conditional Quality-of-Service handling comprises a reduction of the bandwidth provided for the data packet session for transmitting the data packets of the data packet session through the cellular network.

13. The method according to claim 10, wherein before the session establishment request is received, the session management entity is informed of the fact, that the user plane entity has a capability to carry out the conditional Quality-of-service handling.

14. The method according to claim 10, wherein when the at least one condition is met, the Quality-of-Service handling of the conditional Quality-of-Service handling is applied to the data packets of the data packet session.

15. The method according to claim 10, wherein the conditional Quality-of-Service handling comprises a traffic shaping applied to the data packet session.

16. A policy control entity comprising a memory and at least one processing unit, the memory containing instructions executable by said at least one processing unit, wherein the policy control entity is configured to:
- receive subscriber data comprising a policy with an indication that a conditional Quality-of-Service handling is to be applied to a data packet session exchanged between a user equipment of a subscriber and an application in dependence on at least one condition, the subscriber data further comprising a charging indication used for charging the subscriber for the data packet session in dependence on the fact whether the conditional Quality-of-Service handling has been applied to the data packet session;
- generate a policy and charging rule for the data packet session, the policy and charging rule comprising the conditional Quality-of-Service handling of the data packet session in dependence on the condition and the charging of the subscriber in dependence on the fact whether the conditional Quality-of-Service handling has been applied or not; and
- transmit the generated policy and charging rule to a session management entity of the cellular network configured to manage the data packet session in the cellular network.

17. The policy control entity according to claim 16, wherein the at least one condition is a network dependent condition influencing a throughput of data packets of the data packet session through the cellular network.

18. A session management entity comprising a memory and at least one processing unit, the memory containing instructions executable by said at least one processing unit, wherein the session management entity is operative to:
- receive a policy and charging rule for a data packet session from a policy control unit, the policy and charging rule indicating a conditional Quality-of-Service handling to be applied to the data packet session exchanged between a user equipment of a subscriber and an application in dependence on at least one condition, the policy and charging rule indicating that the subscriber is to be charged for the data packet session in dependence on the fact whether the conditional Quality-of-Service handling has been applied to the data packet session or not;
- determine a user plane entity configured to handle the data packet session in the cellular network and configured to apply the policy and charging rule indicating the conditional Quality-of-Service handling to the data packet session; and
- transmit a session establishment request to the determined user plane entity, the session establishment request requesting the determined user plane entity to enforce the conditional Quality-of-Service handling when the at least one condition is met, the session establishment request further requesting the user plane entity to report the handling of the data packets of the data packet session in dependence whether the Quality-of-service handling has been applied to the data packets of the data packet session or not.

19. The session management entity according to claim 18, further being operative to receive a session report including an indication about at least one of an amount of the data packets to which the Quality-of-Service handling has been applied and an amount of the data packets of the data packet session to which the Quality-of-Service handling has not been applied.

20. A user plane entity configured to handle a data packet session in a cellular network, comprising a memory and at least one processing unit, the memory containing instructions executable by said at least one processing unit, wherein the user plane entity is operative to:
- receive a session establishment request, the session establishment request requesting the user plane entity to enforce a conditional Quality-of-Service handling when at least one condition is met, the session establishment request further requesting the user plane entity to report the handling of data packets of the data packet session in dependence whether the Quality-of-service handling has been applied to the data packets of the data packet session or not;
- detect data packets of the data packet session;
- determine whether the at least one condition of the session establishment request is met;

apply the Quality-of-Service handling to the data packets when the at least one condition is met;
determine an amount of data packets to which the Quality-of-Service handling has been applied and to which the Quality-of-Service handling has not been applied; and
transmit a session report to a session management entity including an indication about at least one of an amount of the data packets to which the Quality-of-Service handling has been applied and an amount of the data packets of the data packet session to which the Quality-of-Service handling has not been applied.

* * * * *